Dec. 17, 1935.  G. S. CAVANAUGH  2,024,336
LUBRICATING SYSTEM FOR HIGH SPEED "DRY SUMP" MOTORS
Filed June 3, 1935

Inventor
George S. Cavanaugh
By
Attorney

Patented Dec. 17, 1935

2,024,336

UNITED STATES PATENT OFFICE 2,024,336

LUBRICATING SYSTEM FOR HIGH SPEED "DRY SUMP" MOTORS

George S. Cavanaugh, Los Angeles, Calif.

Application June 3, 1935, Serial No. 24,623

4 Claims. (Cl. 184—6)

This invention relates to an improvement in the lubricating system of internal combustion engines of the type employing what is known as the dry sump crank case construction. With the dry sump type of lubricating system a supply of lubricating oil is maintained in a reservoir separate from the sump portion of the crank case of the motor. During the operation of the motor oil is pumped from this reservoir and fed directly to the bearings and parts of the motor or engine to be lubricated. The oil, which is thrown from the crank shaft and bearings during the operation of the motor, is received in the sump or lower part of the crank case from whence it is returned directly to the reservoir by means of a second pump and the cycle completed. However, the lubricating oil, pumped from the sump, contains great quantities of air, due in part to the scavenger pump, with the result, that when such oil is recirculated to the parts of the engine to be lubricated, not only is the efficiency of the oil pump materially reduced, but the value of the oil as a lubricant becomes greatly diminished with the consequent heating of the motor and loss of efficiency. Consequently, it has heretofore been necessary in the use of high speed dry sump motors (such as are used in racing cars, etc.) to use castor oil as a lubricant, since the foaming property of ordinary mineral oil makes its use impractical for the reasons just noted. It is a primary object of this invention to produce an improved lubricating system for motors of the "dry sump" type which is adapted to the use of mineral oil as a lubricant.

With a lubricating system designed according to my invention the aerated oil or foam is pumped from the crank case into a deaerating chamber where the air is separated from the oil and the deaerated oil returned to a reservoir from which it is pumped directly to the lubricating system of the engine.

In actual practice a motor after running five hundred miles with castor oil as a lubricant the temperature of the oil in the reservoir was found to be 220° F., that is, employing the ordinary common system of lubrication now in use. With the same car after five hundred miles, the car equipped with my improved system and employing a mineral lubricating oil the temperature of the oil in the reservoir was 100° F.

With my system of lubrication, not only is maximum efficiency in lubrication obtained by reason of the oil being deaerated, but a lighter grade of lubricating oil with consequent higher efficiency may be used.

Referring to the drawing, which is for illustrative purposes only—

Figure 1:
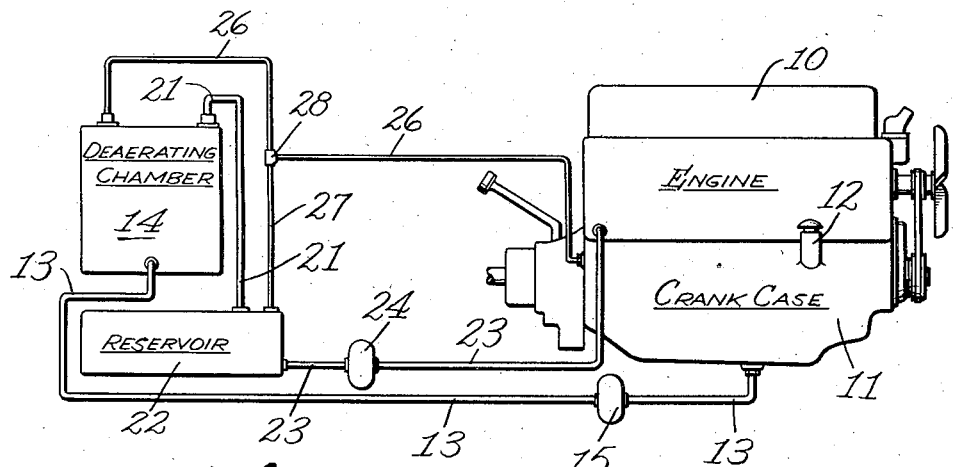
Fig. 1 is a diagrammatical view showing the side elevation of an internal combustion engine or motor and the parts of the lubricating system shown connected thereto.

Referring more particularly to the drawing, 10 designates the engine or motor, 11 the crank case, which crank case is vented by the ordinary breather indicated at 12. From the bottom of the crank case 11, extends a conduit or pipe 13, connected into the deaerating chamber 14, the pipe 13 being provided with a pump indicated at 15.

Figure 2:
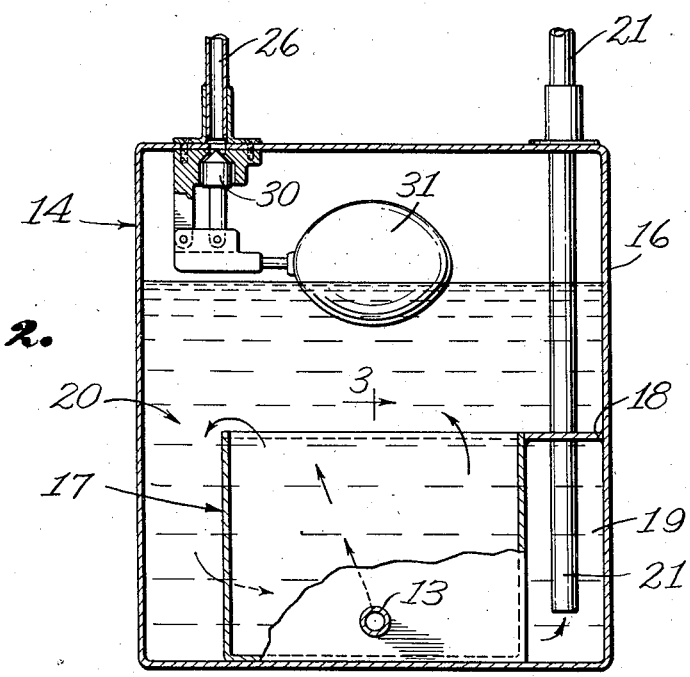
Fig. 2 is a vertical sectional view of the deaerating chamber.
Figure 3:
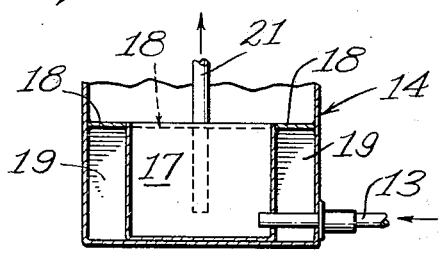
Fig. 3 is a cross sectional view of a portion of the deaerating chamber on line 3—3 of Fig. 2, Fig. 3 being drawn on a reduced scale.

The deaerating chamber consists of a closed shell 16, in the bottom of which is arranged an open top box or tank 17, on three sides of the box a horizontal wall, indicated at 18, extends outwardly to the side walls of the shell 16 thereby forming an oil passage 19 on two sides and one end of the box. The pipe or conduit 13 extends through the shell 16 and into the box 17 so that the foam pumped from the sump of the crank case is discharged into the box flowing upwardly and moving outwardly over the horizontal walls 18 and finally flowing downwardly through the one open passage between the box and shell 16 indicated at 20 in Fig. 2. This downwardly flowing oil passes around the box and is drawn from the bottom of the oil passage 19 by means of a pipe or conduit 21 into a reservoir indicated at 22. Clean or deaired oil from the reservoir 22 is pumped to the ordinary lubricating system of the engine or motor 23, by means of a pump 24, connected in such pipe.

I have found it desirable to return the air removed from the oil in the deaerating chamber to the upper part of the crank case and for this purpose have provided a pipe or air conduit 26 connecting the top of the shell 16 to the crank case. The flow of air from the deaerating chamber or shell 16 is controlled by means of the valve 30 mounted within the shell 16 and cooperating with the air outlet, the valve being controlled by a float 31 movable by the oil level in the shell, it being preferable to maintain the valve in slightly cracked position to maintain a slight pressure within the deaerating chamber.

Provision is also made for venting air from the reservoir 22 which in the form shown consists of a conduit or pipe 27 connected by means of a T 28 to the air conduit or pipe 26. With the system of lubrication, just described, I have found it particularly desirable to place a pump in the draw off line from the crank case between the crank case and the deaerating chamber which permits maintaining some pressure on the oil in the chamber with consequent better separation of air from the oil, resulting in a supply of clean oil for lubricating the engine.

I claim as my invention:

1. In a dry sump type lubricating system for internal combustion motors having a crank case with the lower part thereof forming an oil sump: a deaerating chamber; a conduit connecting the lower part of the crank case to said chamber, a pump in said conduit; a reservoir; an oil conduit connecting the chamber to said reservoir; an air conduit connecting the upper part of said chamber to said crank case; an oil conduit connecting said reservoir to the motor; and a pump in said last named oil conduit.

2. In a dry sump type lubricating system for internal combustion motors having a crank case with the lower part thereof forming an oil sump; a deaerating chamber; means for drawing fluid from the bottom of the crank case into said chamber; an oil reservoir; means for drawing oil from the bottom of said chamber into said reservoir; means for pumping oil from said reservoir; and means for venting accumulated air in said reservoir and said chamber into the crank case.

3. In a dry sump type lubricating system for internal combustion motors having a crank case with the lower part thereof forming an oil sump: a deaerating chamber; means for pumping fluid from the bottom of the crank case into the bottom of said chamber; a reservoir; means for drawing the deaerated oil from the bottom of said chamber into said reservoir; means for pumping oil from said reservoir to said motor; means for returning air from said chamber to the crank case including float controlled valve mechanism in said chamber; and baffle means in said chamber between the oil inlet and outlet of said chamber.

4. In a dry sump type lubricating system for internal combustion motors having a crank case with the lower part thereof forming an oil sump: a deaerating chamber; said chamber consisting of an open top receiving box in the bottom of said chamber spaced apart from the side walls thereof; horizontal walls extending from three sides of the top of the box to the side walls of the chamber to form an oil passage around said box; means for pumping fluid from the crank case into said box; a reservoir; means for conducting oil from the oil passage around said box into the reservoir; means for pumping oil from said reservoir into the motor; an air conduit connecting the top of said chamber to the crank case; and float controlled valve means in said chamber cooperating with said air conduit to regulate the flow of air from said chamber.

GEORGE S. CAVANAUGH.